US012774673B2

(12) United States Patent
Murakami et al.

(10) Patent No.: US 12,774,673 B2
(45) Date of Patent: Oct. 27, 2026

(54) OUTBOARD-MOTOR CYLINDER BLOCK AND MANUFACTURING METHOD THEREFOR

(71) Applicant: SUZUKI MOTOR CORPORATION, Hamamatsu (JP)

(72) Inventors: Haruhiko Murakami, Hamamatsu (JP); Tomoya Matsubara, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 19/097,047

(22) Filed: Apr. 1, 2025

(65) Prior Publication Data

US 2025/0376939 A1 Dec. 11, 2025

(30) Foreign Application Priority Data

Jun. 10, 2024 (JP) ................................ 2024-093829

(51) Int. Cl.
*F01P 3/20* (2006.01)
*B63H 20/28* (2006.01)
(Continued)

(52) U.S. Cl.
CPC .............. *F01P 3/202* (2013.01); *B63H 20/28* (2013.01); *F02F 1/10* (2013.01); *F02F 7/0085* (2013.01); *F02F 11/005* (2013.01)

(58) Field of Classification Search
CPC ... F01P 3/202; B63H 20/28; F02F 1/10; F02F 1/12; F02F 1/004; F02F 7/0085; F02F 11/005; F02F 2001/104
(Continued)

(56) References Cited

U.S. PATENT DOCUMENTS 10,428,762 B2 * 10/2019 Murakami ............ F02F 7/0085
2016/0138179 A1 * 5/2016 Murakami ................ F02F 3/14 205/50
2026/0043372 A1 * 2/2026 Fujita ........................ F02F 1/10

FOREIGN PATENT DOCUMENTS

JP S 57-134571 A 8/1982
JP 2006-183065 A 7/2006
(Continued)

OTHER PUBLICATIONS

Office Action issued on Oct. 31, 2025 in counterpart Japanese Application No. 2024-093829.

*Primary Examiner* — Hai H Huynh
(74) *Attorney, Agent, or Firm* — Stein IP, LLC

(57) ABSTRACT

After an anodized film is formed on the surface of an aluminum alloy part of an outboard-motor cylinder block body other than cylinder bores, sealing treatment is performed on the surface of the anodized film and finishing processing of removing the anodized film on a joining surface to expose the aluminum alloy is performed, and then a chemical conversion coating film is formed on the anodized film, which covers the inner peripheral surface of a water jacket, and the aluminum alloy on the joining surface. Accordingly, an outboard-motor cylinder block in which the aluminum alloy on the inner peripheral surface of the water jacket is covered with the sealed anodized film, the sealed anodized film is further covered with the chemical conversion coating film, and the aluminum alloy on the joining surface is covered with the chemical conversion coating film can be obtained.

9 Claims, 10 Drawing Sheets

(51) Int. Cl.
*F02F 1/10* (2006.01)
*F02F 7/00* (2006.01)
*F02F 11/00* (2006.01)

(58) Field of Classification Search
USPC .............. 123/41.72, 193.2, 193.4; 29/888.01
See application file for complete search history.

(56) References Cited

FOREIGN PATENT DOCUMENTS

| | | | |
|---|---|---|---|
| JP | 2023-072944 | A | 5/2023 |
| JP | 2024-001587 | A | 1/2024 |

* cited by examiner

OUTBOARD-MOTOR CYLINDER BLOCK AND MANUFACTURING METHOD THEREFOR

CROSS-REFERENCE TO RELATED APPLICATIONS

This application claims the benefit of Japanese Patent Application No. 2024-093829 filed on Jun. 10, 2024, in the Japanese Patent Office. All disclosures of the document named above are incorporated herein by reference.

BACKGROUND OF THE INVENTION

Field of the Invention

The present invention relates to an outboard-motor cylinder block and to a manufacturing method therefor.

Description of Related Art

In an industrial internal combustion engine, cooling water is circulated to control the temperature of the internal combustion engine, thereby maintaining performance. Water with additives such as ethylene glycol is used as automobile cooling water typically used, and when it decreases, it is needed to replenish the shortage. In an engine for an outboard motor, for example, seawater (saltwater), which can be easily obtained in use environment, is taken in and used as cooling water.

However, members of an outboard motor are made of a large number of kinds of metallic materials, and thus potential difference occurs due to differences in the metallic materials of members that contact seawater and any metallic material with a low natural electrical potential dissolves into seawater, which potentially causes corrosion. In particular, aluminum alloy, which is used for a cylinder block of the outboard motor or the like, is a metal that is more susceptible to corrosion compared to other materials.

To prevent the occurrence of such corrosion, for example, JP 2023-072944 A discloses a method for an outboard-motor cylinder block body having a cylinder bore and a water jacket around the cylinder bore, including: pressing an area of the inner peripheral surface of the cylinder bore including the boundary between an aluminum alloy as a base material and cast iron of a cylinder sleeve cast therein with an elastic jig; in this state, subjecting the cylinder block body to anodizing to form an anodized film on a surface part of the aluminum alloy; and then carrying out a sealing treatment to seal the pores of the anodized film, thereby forming the sealed anodized film on a joining surface to be joined to a cylinder head and the inner peripheral surface of the water jacket.

SUMMARY OF THE INVENTION

It is an object of the present invention to provide an outboard-motor cylinder block with further improved corrosion resistance and more favorable sealing characteristics with a gasket at a joining surface, and a manufacturing method therefor, because the outboard-motor cylinder block is to be joined to a cylinder head through the gasket.

To achieve the above-described object, an aspect of the present invention is an outboard-motor cylinder block, which has a cylinder bore and a water jacket around the cylinder bore on a joining surface to be joined to a cylinder head, the cylinder block including: a base material of the cylinder block, the base material being made of an aluminum alloy; a cylindrical cylinder sleeve made of cast iron and cast into the aluminum alloy on an inner peripheral surface of the cylinder bore, on a joining surface side of the inner peripheral surface of the cylinder bore, the aluminum alloy being exposed and a boundary existing between the cast iron and the aluminum alloy; an anodized film covering the aluminum alloy on an inner peripheral surface of the water jacket, pores of the anodized film being sealed with a sealing product, resulting in a sealed anodized film; and a chemical conversion coating film covering the sealed anodized film, the chemical conversion coating film further covering the aluminum alloy on the joining surface.

Another aspect of the present invention is a manufacturing method for an outboard-motor cylinder block, an outboard-motor cylinder block body having a cylinder bore and a water jacket around the cylinder bore formed on a joining surface to be joined to a cylinder head, and a cylindrical cylinder sleeve made of cast iron being cast into an aluminum alloy as a base material of the cylinder block on an inner peripheral surface of the cylinder bore, the cylinder sleeve being exposed to protrude inward in the radial direction of the cylinder bore relative to the base material, and the base material being exposed at an end part on the cylinder head side of the inner peripheral surface of the cylinder bore and at another end part on a crank shaft side opposite the cylinder head side, the manufacturing method including the steps of: pressing the end part on the cylinder head side where the base material is exposed with a first elastic jig and pressing the other end part on the crank shaft side where the base material is exposed with a second elastic jig; forming an anodized film on a surface of an aluminum alloy part of the outboard-motor cylinder block body other than the cylinder bore by carrying out an anodizing treatment in a state of being pressed with the first and second elastic jigs; sealing a surface of the anodized film by carrying out a sealing treatment in the state of being pressed with the first and second elastic jigs; detaching the first and second elastic jigs and subjecting the joining surface to a finishing processing which removes the anodized film on the joining surface to expose the aluminum alloy as the base material; and forming a chemical conversion coating film on a surface of the anodized film covering an inner peripheral surface of the water jacket and on a surface of the aluminum alloy exposed on the joining surface.

The chemical conversion coating film may contain a primary component of the sealing product. The primary component of the sealing product may be chromium and/or zirconium. The first and second elastic jigs may each be an elastic bag body in fluid communication with a gas supply unit. In the pressing step, the elastic bag bodies may be disposed in the cylinder bore and supplied with gas from the gas supply unit to inflate the elastic bag bodies so that the end parts on the cylinder head side and the crank shaft side where the base material is exposed can be pressed by the elastic bag bodies. The elastic bag bodies may be inflated so that a maximum outer diameter part of each elastic bag body in the radial direction of the cylinder bore can be formed outside the end parts on the cylinder head side and the crank shaft side of the inner peripheral surface of the cylinder bore and so that the maximum outer diameter of each elastic bag body in the radial direction of the cylinder bore can be larger than the inner peripheral diameters of the end parts on the cylinder head side and the crank shaft side of the inner peripheral surface of the cylinder bore where the base material is exposed. Shot blast treatment or alkaline liquid treatment may be carried out on the outboard-motor cylinder block body before the step of forming the anodized film. The sealed anodized film of the outboard-motor cylinder block body may be treated with alkaline liquid after the step of finishing processing and before the step of forming the chemical conversion coating film. Furthermore, the first elastic jig and the second elastic jig may be coupled through a joining device equipped with a gas supply unit. The joining device preferably has a configuration that allows extension and contraction adjustment in the axial direction of the cylinder bore. An inner peripheral surface corner of the cylinder sleeve on the end part side where the base material is exposed on the crank shaft side may be chamfered. An inner peripheral surface corner of the cylinder sleeve on the cylinder head side may be chamfered. The lengths of the elastic bag bodies in the axial direction of the cylinder bore are preferably longer than the lengths of the end parts of the inner peripheral surface of the cylinder bore where the base material is exposed on the cylinder head side and the crank shaft side.

According to the present invention as described above, since the aluminum alloy as the base material on the inner peripheral surface of the water jacket is covered with a sealed anodized film, the sealed anodized film is further covered with a chemical conversion coating film, and the aluminum alloy as the base material at the joining surface is covered with a chemical conversion coating film, it is possible to obtain more favorable sealing characteristics with a gasket at the joining surface and further improved corrosion resistance of the joining surface and the inner peripheral surface of the water jacket.

DESCRIPTION OF PREFERRED EMBODIMENTS

An embodiment of an outboard-motor cylinder block and a manufacturing method therefor according to the present invention will be described below with reference to the accompanying drawings.

A manufacturing method for an outboard-motor cylinder block according to the present embodiment includes: a pressing step in which end parts of the inner peripheral surface of a cylinder bore of an outboard-motor cylinder block body where a base material is exposed on a cylinder head side and a crank shaft side are pressed with elastic jigs; an anodizing treatment step in which while the end parts are pressed, anodizing treatment is performed to form an anodized film on the surface of an aluminum alloy part of the outboard-motor cylinder block body; a sealing treatment step in which while the regions are pressed, sealing treatment is performed to seal the anodized film; a finishing processing step in which the elastic jigs are detached and the anodized film on a joining surface of the outboard-motor cylinder block body is removed to expose the base material; and a chemical conversion coating step in which a chemical conversion coating film is formed on the surface of the anodized film covering the inner peripheral surface of a water jacket and on the joining surface.

Figure 1:
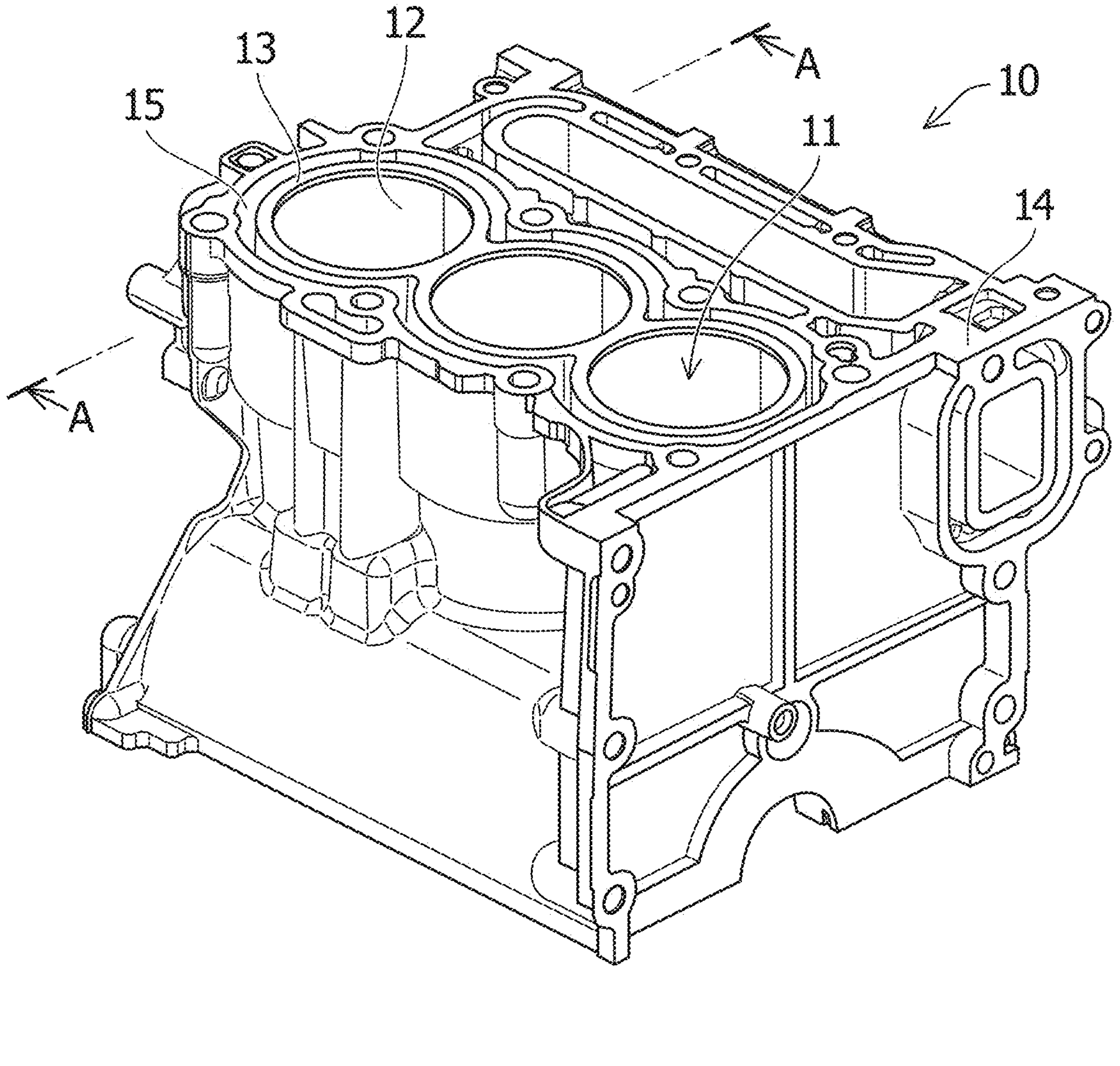
FIG. 1 is a perspective view from a cylinder head side, illustrating an example of an outboard-motor cylinder block body to be provided with anodizing treatment and sealing treatment in a manufacturing method for an outboard-motor cylinder block according to the present invention.
Figure 2:
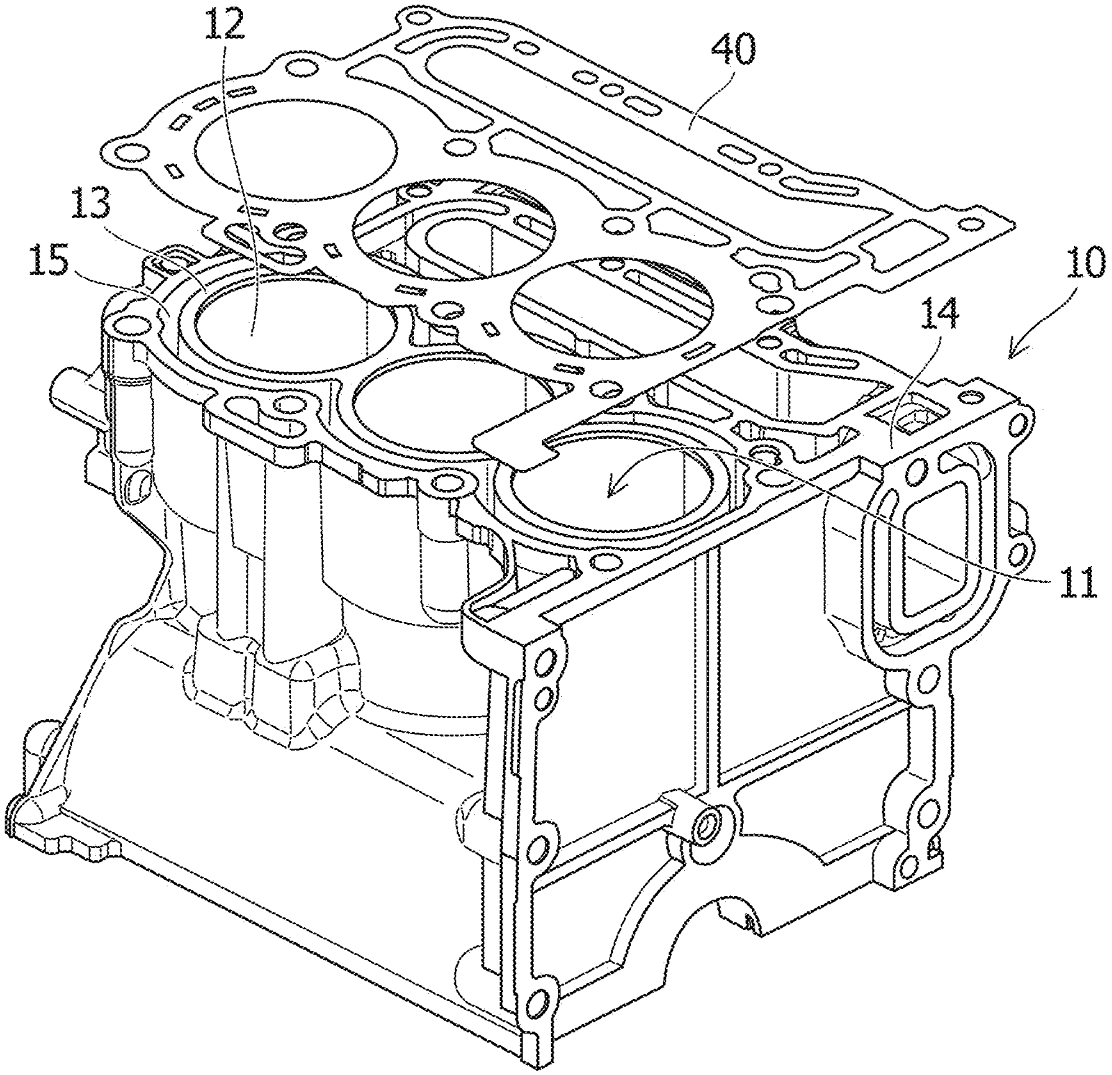
FIG. 2 is a perspective view illustrating a gasket interposed between the outboard-motor cylinder block body illustrated in FIG. 1 and the cylinder head.
Figure 3:
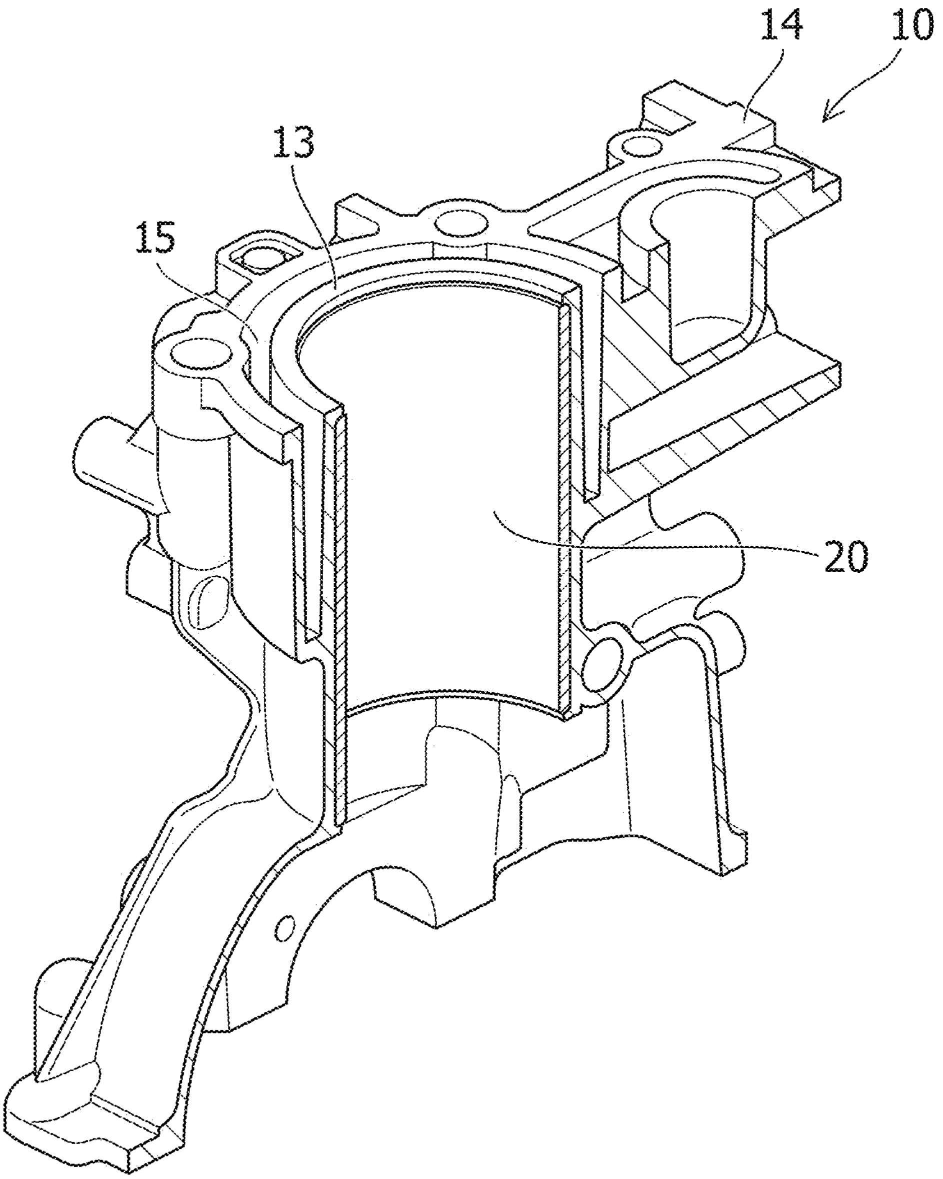
FIG. 3 is a sectional perspective view illustrating the outboard-motor cylinder block body along line A-A in FIG. 1.

First, a cylinder block body to be subjected to anodizing treatment, sealing treatment, and the like in the present method will be described below. As illustrated in FIGS. 1 to 4, a cylinder block body 10 is formed with a plurality of cylinder bores 11 and a water jacket 15 around the cylinder bores 11 on a joining surface 14 to be joined to a cylinder head (not illustrated). As illustrated in FIG. 2, the cylinder block is to be joined to the cylinder head through a gasket 40, and thus, the joining surface 14 needs to have favorable sealing characteristics with the gasket 40. Note that, in these diagrams, the cylinder block body 10 is illustrated in a state in which three cylinder bores 11 are horizontally arranged, but the cylinder block body 10 is mounted on an actual outboard motor (not illustrated) in a state in which the cylinder bores 11 are vertically arranged. The number of cylinder bores 11 may be one for a single-cylinder engine.

Figure 4:
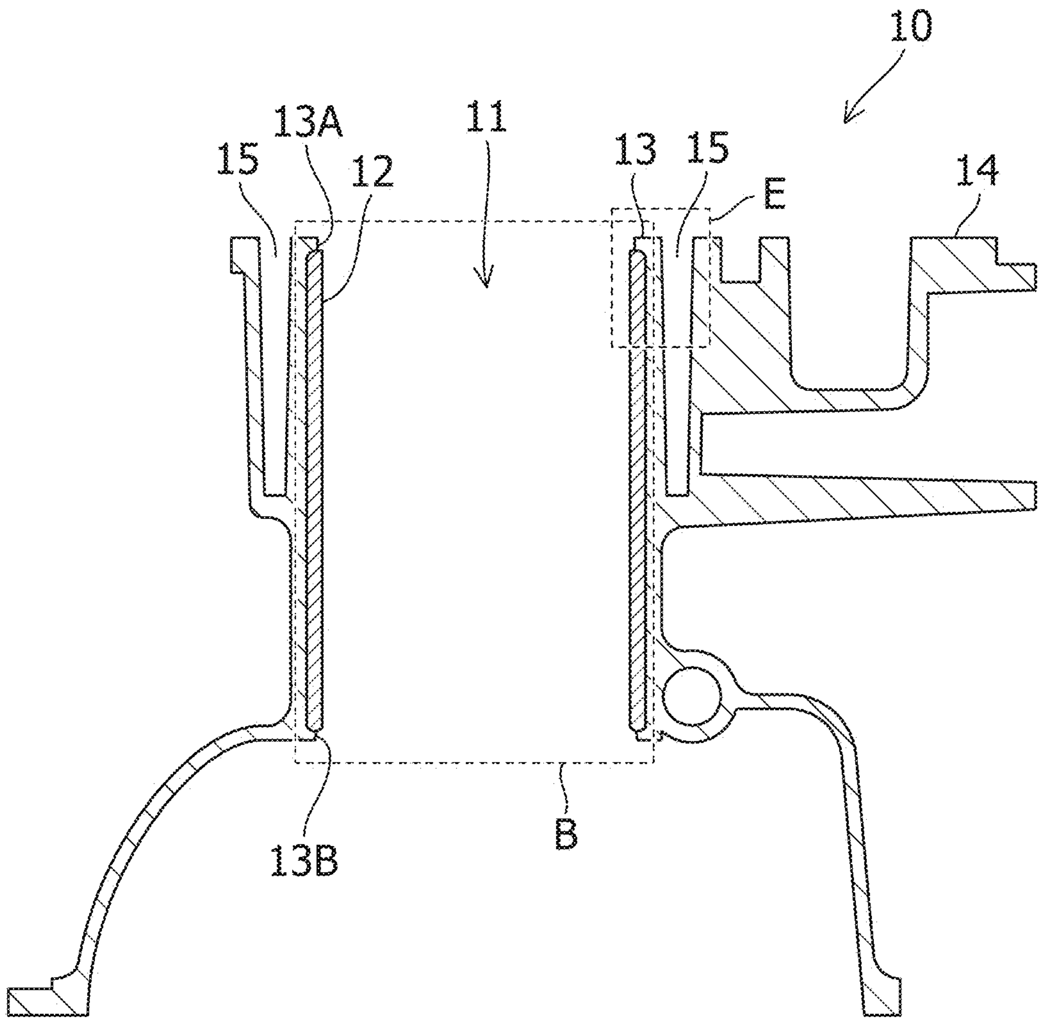
FIG. 4 is a sectional side view illustrating the outboard-motor cylinder block body along line A-A in FIG. 1.

In particular, as illustrated in FIG. 4, a cylindrical cylinder sleeve 12 made of cast iron is cast into aluminum alloy as a base material 13 on the inner peripheral surface of each cylinder bore 11. With such a cast-in method, normally, the entire inner peripheral surface of the cylinder bore 11 does not have the cylinder sleeve 12, but the aluminum alloy as the base material 13 is exposed on the inner peripheral surface at end parts 13A on the cylinder head side and 13B on a crank shaft side opposite the cylinder head side. Accordingly, the boundary between the cast iron as the cylinder sleeve 12 and the aluminum alloy as the base material 13 exists at the end parts of the inner peripheral surface of the cylinder bore 11 on the cylinder head side and the crank shaft side. Furthermore, with the cast-in method, the cylinder sleeve 12 is exposed to protrude inward in the radial direction of the cylinder bore 11 relative to the base material 13 as illustrated in FIG. 4, in other words, steps exist between the cylinder sleeve 12 and the base material 13 in some cases.

The height of each step is, for example, 0.5 to 2 mm, but it is not limited thereto. The length of each cylinder bore 11 in its axial direction at the end part 13A of the inner peripheral surface of the cylinder bore 11 where the base material 13 is exposed on the cylinder head side is, for example, 3 to 5 mm, but it is not limited thereto, and the length of each cylinder bore 11 in the axial direction at the end part 13B of the inner peripheral surface of the cylinder bore 11 where the base material 13 is exposed on the crank shaft side is, for example, 2 to 4mm, but it is not limited thereto.

Figure 5:
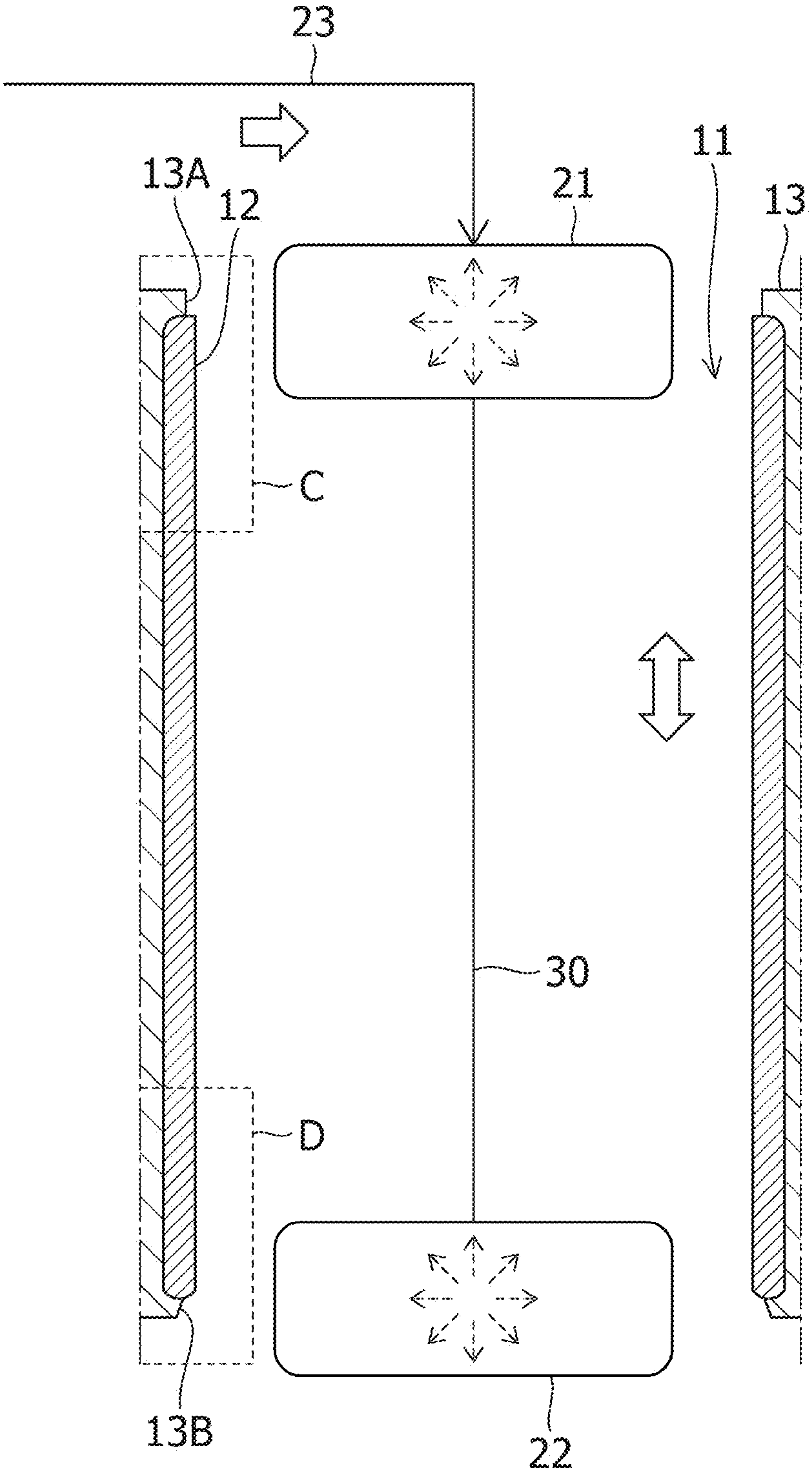
FIG. 5 is a partially cross-sectional view of the outboard-motor cylinder block body in dotted line frame B in FIG. 4 for description of an embodiment of the manufacturing method for an outboard-motor cylinder block according to the present invention.

When anodizing treatment is performed without dissolving the cast iron of a cylinder sleeve 12 in the cylinder block body 10 having such steps on the inner peripheral surface of each cylinder bore 11 between the cylinder sleeve 12 of cast iron and the base material 13 of aluminum alloy, the pressing step of pressing with elastic jigs in the present embodiment as illustrated in FIG. 5 presses the end part 13A of the inner peripheral surface of the cylinder bore 11 where the base material 13 is exposed on the cylinder head side with a first elastic jig 21, and presses the end part 13B of the inner peripheral surface of the cylinder bore 11 where the base material 13 is exposed on the crank shaft side with a second elastic jig 22.

The first elastic jig 21 and the second elastic jig 22 are expandable and contractible elastic bag bodies equipped with a gas supply unit 23, with which the end parts 13A and 13B of the inner peripheral surface of the cylinder bore 11 where the base material 13 is exposed on the cylinder head side and the crank shaft side can be pressed by disposing the elastic bag bodies in the cylinder bore 11 and supplying gas from the gas supply unit 23 to inflate the first and second elastic jigs 21 and 22 as the elastic bag bodies.

The material of the elastic bag bodies of the first and second elastic jigs 21 and 22 may be a material having elasticity with which the entire circumference of the inner peripheral surface of the cylinder bore 11 can be uniformly pressed, and is, for example, rubber or thermoplastic elastomer. Examples of the rubber include silicone rubber, nitrile butadiene rubber (NBR), styrene-butadiene rubber (SBR), butyl rubber (IIR), fluoro rubber (FKM), ethylene propylene diene monomer rubber (EPDM), and chloroprene rubber. Examples of the thermoplastic elastomer include polyester-based (TPC), polyurethane-based (TPU), and polyvinyl chloride-based (TPVC). In particular, the elastic jigs contact treatment liquid in the next step of anodizing treatment, and thus, preferably, have excellent chemical resistance and are more preferably made of, for example, silicone rubber.

As for the dimensions of the elastic bag bodies of the first and second elastic jigs 21 and 22, their maximum outer diameters in the radial direction of the cylinder bore 11 when expanded only need to be to larger than the inner peripheral diameters of the end parts 13A and 13B of the inner peripheral surface of the cylinder bore 11 where the base material 13 is exposed, and their minimum outer diameters when contracted only needs to be such that the elastic bag bodies can be attached to and detached from the inner peripheral surface of the cylinder bore 11. The lengths of the elastic bag bodies in the axial direction of the cylinder bore 11 are preferably longer than the lengths of the end parts 13A and 13B of the inner peripheral surface of the cylinder bore 11 where the base material 13 is exposed on the cylinder head side and the crank shaft side.

For example, jigs that are commercially available under the name "AIR PICKER" and have an elastic bag section that is expandable and contractible using gas pressure may be used as the elastic bag bodies. The first elastic jig 21 and the second elastic jig 22 may be coupled through a joining device 30 equipped with a gas supply unit as illustrated in FIG. 5, and accordingly, the two elastic bag bodies can be inflated simultaneously. Details of the joining device 30 will be described later.

Figure 6:
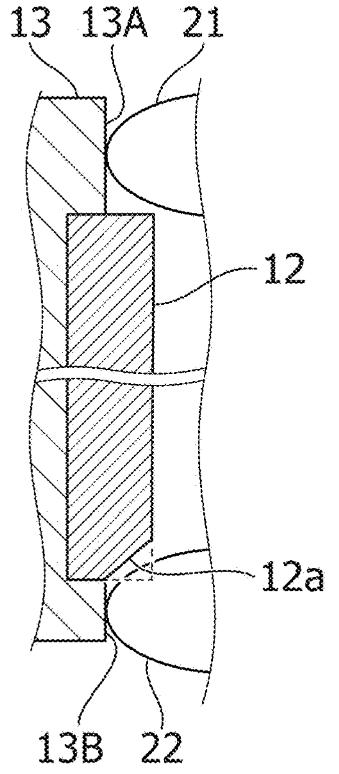
FIG. 6 is a partially enlarged cross-sectional view of the outboard-motor cylinder block body in dotted line frames C and D in FIG. 5 for description of the embodiment of the manufacturing method for an outboard-motor cylinder block according to the present invention.

In the present embodiment, first, as illustrated in FIG. 6, the elastic bag bodies of the first and second elastic jigs 21 and 22 are disposed such that the elastic bag bodies contact the end parts 13A and 13B, respectively, of the inner peripheral surface of the cylinder bore 11 where the base material 13 is exposed on the cylinder head side and the crank shaft side. The elastic bag bodies are preferably disposed such that the central positions of the elastic bag bodies in the axial direction of the cylinder bore 11 contact the end parts 13A and 13B where a base material 13 is exposed.

Figure 7:
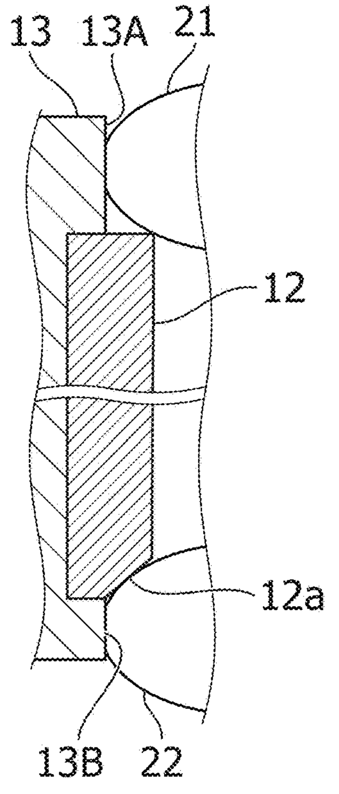
FIG. 7 is a partially enlarged cross-sectional view of the outboard-motor cylinder block body in dotted line frames C and D in FIG. 5 for description of the embodiment of the manufacturing method for an outboard-motor cylinder block according to the present invention.

Subsequently, gas is supplied to the elastic bag bodies of the first and second elastic jigs 21 and 22 to start expansion of the elastic bag bodies as illustrated in FIG. 7.

Accordingly, the elastic bag bodies come into surface contact with the end parts 13A and 13B of the inner peripheral surface of the cylinder bore 11 where the base material 13 is exposed.

Figure 8:
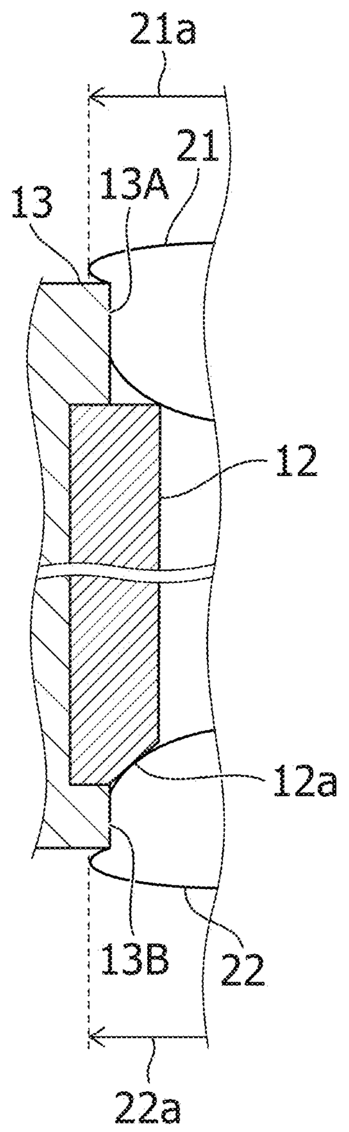
FIG. 8 is a partially enlarged cross-sectional view of the outboard-motor cylinder block body in dotted line frames C and D in FIG. 5 for description of the embodiment of the manufacturing method for an outboard-motor cylinder block according to the present invention.

Then, gas is further supplied to the elastic bag bodies of the first and second elastic jigs 21 and 22 to inflate the elastic bag bodies so that, as illustrated in FIG. 8, maximum outer diameter parts 21*a* and 22*a* of the elastic bag bodies of the first and second elastic jigs 21 and 22 in the radial direction of the cylinder bore 11 are formed outside an end part 11A of the cylinder bore 11 on the cylinder head side and an end part 11B thereof on the crank shaft side, and the maximum outer diameters of the elastic bag bodies in the radial direction of the cylinder bore are larger than the inner peripheral diameters of the end parts 13A and 13B of the inner peripheral surface of the cylinder bore 11 where the base material 13 is exposed on the cylinder head side and the crank shaft side.

Since gas is supplied until such a state is reached, pressing force of the elastic bag bodies of the first and second elastic jigs 21 and 22 is increased while sufficient surface contact areas are established with the end parts 13A and 13B of the inner peripheral surface of the cylinder bore 11 where the base material 13 is exposed on the cylinder head side and the crank shaft side, and accordingly, improved sealing characteristics with the aluminum alloy as the base material 13 is obtained. Thus, in the next step of anodizing treatment, it is possible to prevent treatment liquid from seeping beyond the end parts 13A and 13B where the aluminum alloy is exposed and into the cylinder sleeve 12 of cast iron. Moreover, since the first elastic jig 21 and the second elastic jig 22 are coupled through the joining device 30, the cylinder bore 11 can be sandwiched and held between the expanded elastic bag body of the first elastic jig 21 and the expanded elastic bag body of the second elastic jig 22 so that positional shift of the first and second elastic jigs 21 and 22 in the axial direction of the cylinder bore 11 can be reduced in the next step of anodizing treatment.

Figure 9:
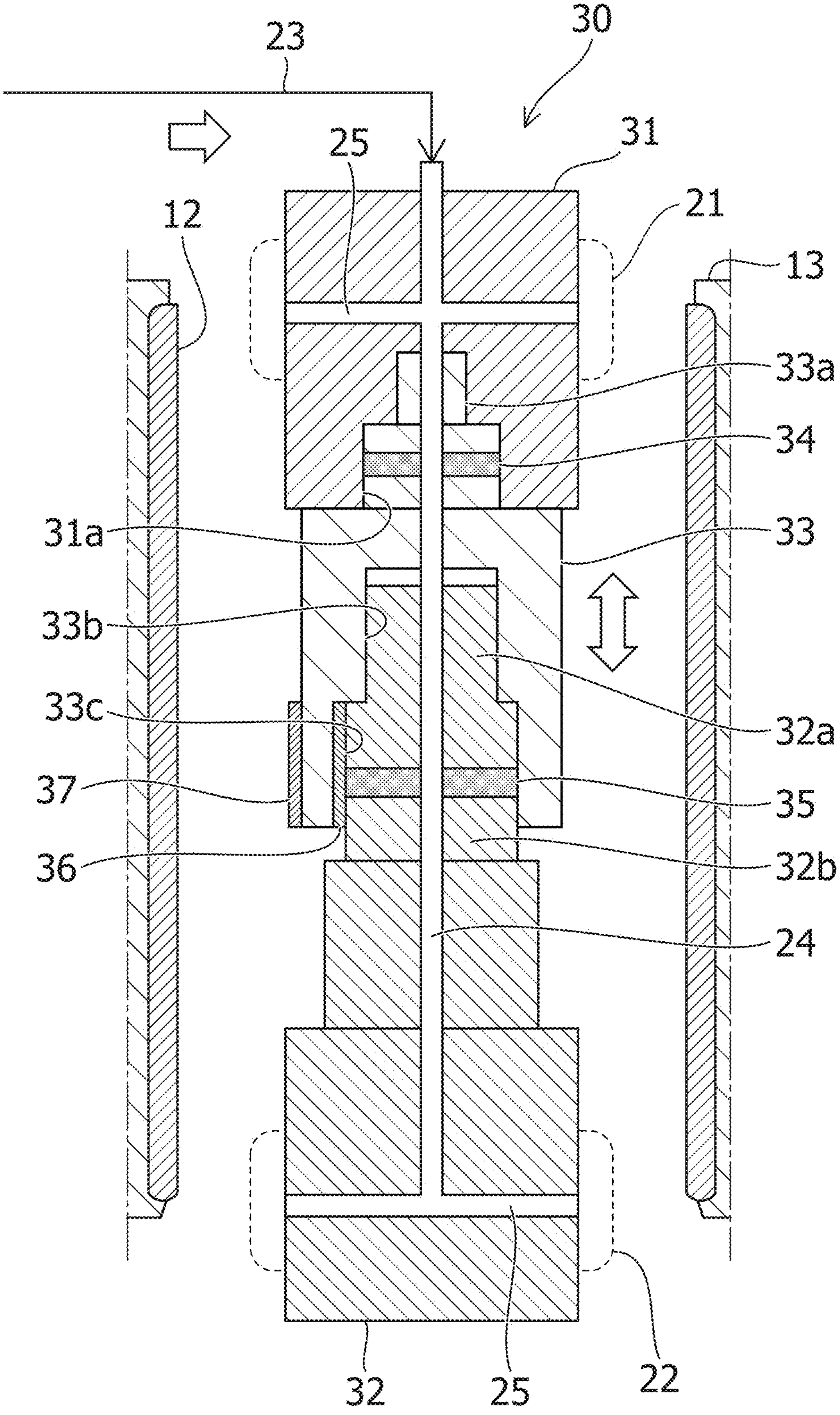
FIG. 9 is a cross-sectional view illustrating an example of a joining device used for elastic jigs in the embodiment of the manufacturing method for an outboard-motor cylinder block according to the present invention.

The joining device 30 preferably has a configuration that allows extension and contraction adjustment in the axial direction of the cylinder bore as illustrated in FIG. 9, for example. The joining device 30 that allows extension and contraction adjustment includes a first support section 31 that supports the elastic bag body of the first elastic jig 21 in an expandable and contractible manner, a second support section 32 that supports the elastic bag body of the second elastic jig 22 in an expandable and contractible manner, and a joining section 33 that connects the first support section 31 and the second support section 32 in a manner that allows extension and contraction adjustment. The first support section 31, the second support section 32, and the joining section 33 contain a gas path 24 for gas flow from the gas supply unit 23 in the order of the first support section 31, the joining section 33, and the second support section 32. The first and second support sections 31 and 32 contain a gas path 25 for gas flow from the gas path 24 to the elastic bag bodies, respectively.

The first support section 31 includes a cylindrical housing section 31*a* for housing a cylindrical tip section 33*a* of the joining section 33. The second support section 32 includes a cylindrical tip section 32*a* formed with a male screw, and a cylindrical base end section 32*b* having an outer diameter larger than that of the tip section 32*a*. The joining section 33 includes a cylindrical first housing section 33*b* formed with a female screw for housing the tip section 32*a* of the second support section 32, and a cylindrical second housing section 33*c* for housing the base end section 32*b* of the second support section 32. The inner peripheral diameters of the first and second housing sections 33*b* and 33*c* of the joining section 33 correspond to the outer diameters of the tip section 32*a* and the base end section 32*b* of the support section 32. Through screw rotation, the second support section 32 can be slid relative to the joining section 33 in the axial direction of the cylinder bore 11. The space between the housing section 31*a* of the first support section 31 and the tip section 33*a* of the joining section 33 is sealed with an O ring 34, and the space between the base end section 32*b* of the second support section 32 and the housing section 33*c* of the joining section 33 is sealed with an O ring 35.

A position sensor 36 is provided in the second housing section 33*c* of the joining section 33, extending in the axial direction of the cylinder bore 11. The position sensor 36 can measure a slide amount of the second support section 32 relative to the joining section 33 by detecting the base end section 32*b* of the second support section 32. A display device 37 configured to display the slide amount measured by the position sensor 36 is provided on the outer peripheral surface of the joining section 33.

With the joining device 30 having such a configuration that allows extension and contraction adjustment, the spacing between the first elastic jig 21 and the second elastic jig 22 can be optionally changed. To obtain excellent sealing characteristics of both the first elastic jig 21 and the second elastic jig 22, the positions of both the first elastic jig 21 and the second elastic jig 22 need to be finely adjusted relative to the inner peripheral surface of the cylinder bore 11 and are desirably adjusted in increments of approximately 1 mm. Since the slide amount of the second support section 32 through screw rotation is to be displayed on the display device 37, fine adjustment of the spacing between the first elastic jig 21 and the second elastic jig 22 can be easily performed. Moreover, the elastic jigs can be quickly attached to models with different bore strokes, and thus, there is no need to produce and store elastic jigs for each model.

FIGS. 5 to 7 illustrate a case in which the length of the end part 13B where the base material 13 is exposed on the crank shaft side in the axial direction of the cylinder bore 11 is shorter than that of the end part 13A of the inner peripheral surface of the cylinder bore 11 where the base material 13 is exposed on the cylinder head side. In this case, since there is a step with the cylinder sleeve 12, the end part 13B where the base material 13 is exposed comes into surface contact with the corresponding elastic bag body in an insufficient area in some cases. In such a case, an inner peripheral surface corner of the cylinder sleeve 12 on the end part 13B side where the base material 13 is exposed on the crank shaft side is chamfered as illustrated in FIGS. 5 to 7. Accordingly, a chamfered surface 12*a* of the cylinder sleeve 12 can come into surface contact with the elastic bag body, and thus, the elastic bag body comes into surface contact in a larger area beyond the boundary between the cylinder sleeve 12 and the base material 13, thereby significantly improving the sealing characteristics. Moreover, burrs on the inner peripheral surface corner of the cylinder sleeve 12 are removed by chamfering, and thus, the elastic bag body can be prevented from being damaged by burrs.

Note that, in FIGS. 5 to 7, the chamfered surface 12*a* of the cylinder sleeve 12 is chamfered to be directly adjacent to the end part 13B where the base material 13 is exposed, but the present invention is not limited thereto, and the side surface of the cylinder sleeve 12 may remain between the chamfered surface 12*a* of the cylinder sleeve 12 and the end part 13B where the base material 13 is exposed. Moreover, although the above description is made for a case in which the inner peripheral surface corner of the cylinder sleeve 12 on the crank shaft side is chamfered, the present invention is not limited to the crank shaft side and an inner peripheral surface corner of the cylinder sleeve 12 on the cylinder head side may be chamfered as needed.

The chamfering is not limited to the above-described inner peripheral surface corners of the cylinder sleeve 12, and the inner peripheral surface corners of the end parts 13A and 13B of the inner peripheral surface of the cylinder bore 11 where the base material 13 is exposed on the cylinder head side and the crank shaft side may be chamfered. Accordingly, the surface contact areas of the end parts 13A and 13B where the base material 13 is exposed with the elastic bag bodies can be increased. Alternatively, the inner peripheral surface corners of the cylinder sleeve 12 and the inner peripheral surface corners of the end parts 13A and 13B where the base material 13 is exposed may be both chamfered. In this case, the chamfered surfaces of the cylinder sleeve 12 may be aligned flush with the chamfered surfaces of the end parts 13A and 13B where the base material 13 is exposed. Accordingly, the elastic bag bodies can come into surface contact with larger areas beyond the boundary between the cylinder sleeve 12 and the base material 13.

Note that a masking agent may be applied to the inner peripheral surface of the cylinder bore 11 before pressing with the first and second elastic jigs 21 and 22. A commercially available masking agent for metal surface treatment may be used as the masking agent.

Then, in such a state in which the first and second elastic jigs 21 and 22 are disposed in the cylinder bore 11, an anodizing treatment step is performed in which the cylinder block body 10 is immersed in treatment liquid and is subjected to electrolytic treatment to form a porous anodized film on the surface of the cylinder block body 10. The aluminum alloy as the base material of the cylinder block body 10 is dissolved through the electrolytic treatment, dissolved aluminum combines with oxygen in the treatment liquid, and an aluminum oxide anodized film is formed on the surface of the aluminum alloy part of the cylinder block body 10.

Either an acidic bath such as one of sulfuric acid, oxalic acid, phosphoric acid, or chromic acid, or a basic bath such as one of sodium hydroxide, sodium phosphate, or sodium fluoride may be used as the treatment liquid of anodizing treatment. The electrolytic treatment is performed by using the cylinder block body 10 as the anode and electrode plates (not illustrated) such as titanium or carbon as the cathode and applying voltage.

The thickness of the anodized film formed in the anodizing treatment step is not particularly limited, but it is preferably 1 to 60 μm, and more preferably 3 to 20 μm, for example.

In anodizing treatment, when aluminum in the base material of the cylinder block body 10 is oxidized to form a film, transformation of aluminum into aluminum oxide causes volume expansion. Specifically, about half of the thickness of the formed anodized film is a penetrating film that has penetrated inward from the surface of the aluminum alloy base material, and the remaining half of the thickness is a growth film that has grown from the base material surface toward the elastic jig side.

The inner peripheral surface of the cylinder bore 11, which is covered with the first and second elastic jigs 21 and 22, does not contact the treatment liquid, and the cast iron of the cylinder sleeve 12 can be prevented from dissolving. Moreover, even if the treatment liquid seeps between the first and second elastic jigs 21 and 22 and the end parts 13A and 13B where the base material 13 is exposed and electrolytic reaction occurs with the aluminum alloy as the base material 13, the anodized film grows on the elastic jig side as described above, thereby eliminating any small gaps with the elastic jigs and further reducing seepage of the treatment liquid.

As further description of the anodizing treatment step, a direct-current electrolytic method or an alternating-current/direct-current superimposed electrolytic method may be used as an electrolytic method. Regardless of which electrolytic method is used, the anodized film is formed by an anodizing reaction and includes a penetrating film and a growth film as described above, but different characteristics of the anodized film are obtained.

The anodized film formed by the direct-current electrolytic method includes cells that have linearly grown while etching in a direction perpendicular to the base material surface. When a large number of impurities or additives (such as silicon) exist in the aluminum alloy, the cells do not grow around impurities or additives near the surface, whereas recessed parts are generated at the surface where impurities or additives are deposited, which forms an anodized film with a high surface roughness. The formed anodized film has a large thickness variance.

An anodized film formed by the alternating-current/direct-current superimposed electrolytic method has a structure in which cells form substantially continuous spherical or elliptical shapes with a height less than twice the cell diameter and the cells cluster together to form a grape-like shape. Accordingly, the anodized film formed by the alternating-current/direct-current superimposed electrolytic method has a low volume ratio of pores enclosed within the cells to the cell walls. However, the anodized film formed by the direct-current electrolytic method has a high volume ratio of pores enclosed within the cells to the cell walls because the cells are formed in a continuous cylindrical shape.

The anodized film formed by the alternating-current/direct-current superimposed electrolytic method has a substantially uniform thickness on the surface of the base material because, even if impurities or additives that would hinder cell growth exist during the process of cell growth, the cells grow while avoiding or enclosing the impurities or additives, and accordingly, cell growth is not encumbered by the impurities or additives. In the anodized film thus formed by the alternating-current/direct-current superimposed electrolytic method, the direction of cell growth is finely bent in random directions relative to the surface of the base material, and accordingly, resistance to penetrating water occurs where the direction changes, thereby preventing water from reaching the base material. Thus, its corrosion resistance is higher than that of the anodized film formed by the direct-current electrolytic method.

Subsequently, a sealing treatment step is performed by immersing in sealing treatment liquid or applying sealing treatment liquid to the cylinder block body 10 with an anodized film formed on its surface as described above while the first and second elastic jigs 21 and 22 are disposed. Accordingly, the pores of the porous anodized film are blocked, which can improve the corrosion resistance of the anodized film. Note that, before sealing treatment is performed, pretreatment such as water cleaning is preferably performed to prevent mixture of adhered treatment liquid of the anodizing treatment with the sealing treatment liquid and remove the treatment liquid remaining in the pores of the anodized film.

For the sealing treatment step, well-known methods such as a hydrothermal method, a boiling water method, a nickel acetate method, a low-temperature sealing treatment method, and a lithium hydroxide method can be employed. Note that there are various kinds of sealing treatment as described above and application of electrolysis during anodizing treatment causes pitting corrosion in the cast iron sleeve, but since mild surface rust occurs during sealing treatment, the sealing treatment step can be performed after detaching the first and second elastic jigs 21 and 22 if such surface corrosion is acceptable.

The low-temperature sealing treatment method will be described below as an example of sealing treatment. The sealing treatment liquid of the low-temperature sealing treatment method may be, for example, liquid containing chromium and/or zirconium and fluorine ions, which additionally contains cobalt, calcium, zinc, or the like. It is thought that, by the low-temperature sealing treatment method, negatively charged fluorine ions are adsorbed in positively charged gel parts of the pores of the anodized film and react to generate metal hydroxide such as chromium hydroxide, and then, aluminum fluoride and metal hydroxide co-precipitate through a series of reactions, which results in sealing. The sealing treatment liquid preferably has temperature of 5 to 70° C. and pH of 2 to 7, and treatment time is preferably 1 to 900 seconds.

Although described later in detail, the sealing treatment liquid used in the present embodiment preferably contains chromium and zirconium from the perspective of corrosion resistance. Trivalent chromium salts such as chromium nitrate, chromium sulfate, chromium chloride, chromium phosphate, chromium acetate, and chromium hydroxide can be used as a chromium source. Cobalt nitrate, cobalt sulfate, cobalt chloride, and the like can be used as a cobalt source. Hydrogen fluoride, ammonium fluoride, potassium fluoride, sodium fluoride, and the like can be used as a fluorine ion source. Zirconium oxychloride, zirconium sulfate, zirconium nitrate, zirconium oxide, and the like can be used as a zirconium source.

Figure 10:
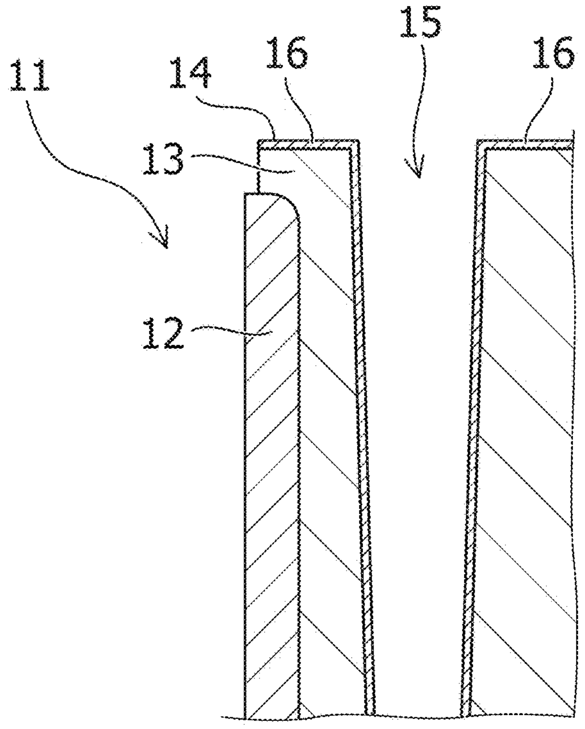
FIG. 10 is a partially enlarged cross-sectional view of the outboard-motor cylinder block body in dotted line frame E in FIG. 4 for description of the embodiment of the manufacturing method for an outboard-motor cylinder block according to the present invention.

After the sealing treatment step is performed, the first and second elastic jigs 21 and 22 are detached from inside the cylinder bore 11. FIG. 10 illustrates the cylinder block body 10 formed with the anodized film sealed in this manner. At the inner peripheral surface of each cylinder bore 11 of the cylinder block body 10, the cast iron of the cylinder sleeve 12 and the aluminum alloy of the base material 13 are exposed, and a sealed anodized film 16 is formed on the joining surface 14 of the cylinder block body 10 and the inner peripheral surface of the water jacket 15.

Figure 11:
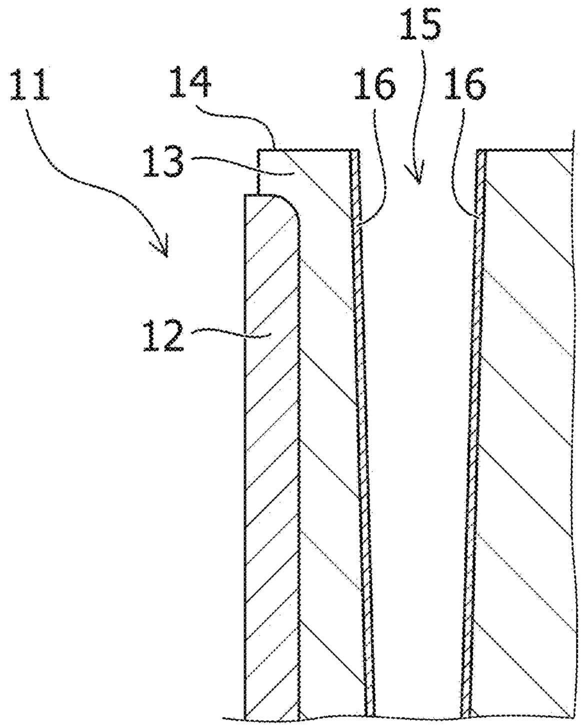
FIG. 11 is a partially enlarged cross-sectional view of the outboard-motor cylinder block body in dotted line frame E in FIG. 4 for description of the embodiment of the manufacturing method for an outboard-motor cylinder block according to the present invention.

In the present embodiment, a finishing processing step is performed on the joining surface 14 of the cylinder block body 10, and finishing processing is performed until the anodized film 16 on the joining surface 14 is removed and the aluminum alloy as the base material 13 is exposed, as illustrated in FIG. 11. The finishing processing is not particularly limited as long as it can smooth the joining surface 14, but may employ a fabrication method such as rotating a flat end mill by using a milling machine or performing surface grinding by using a grinding machine. Alkaline machining liquid is preferably used as machining liquid of the finishing processing. Accordingly, color unevenness on the joining surface 14 of the cylinder block body 10 can be reduced, which will be described later in detail.

Figure 12:
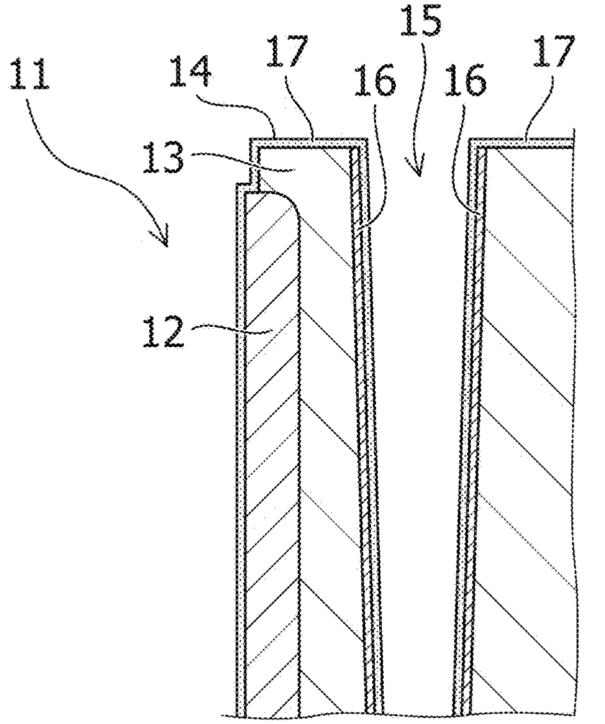
FIG. 12 is a partially enlarged cross-sectional view of the outboard-motor cylinder block body in dotted line frame E in FIG. 4 for description of the embodiment of the manufacturing method for an outboard-motor cylinder block according to the present invention.

Subsequently, a chemical conversion coating step is performed on the cylinder block body 10 with the joining surface 14 subjected to the finishing processing, as described above. First, chemical conversion treatment is performed on the cylinder block body 10 to form a chemical conversion coating film 17 on the entire surface of the cylinder block body 10 as illustrated in FIG. 12, in other words, the surfaces of the cast iron of the cylinder sleeve 12 and the aluminum alloy of the base material 13 on the inner peripheral surface of each cylinder bore 11 of the cylinder block body 10, the joining surface 14 of the cylinder block body 10 where the aluminum alloy is exposed, as well as the surface of the anodized film 16 covering the inner peripheral surface of the water jacket 15.

While well-known chemical conversion treatments can be widely employed, it is preferable to use chemical conversion treatment liquid containing the same components as the primary components of the sealing treatment liquid used in the sealing treatment step. For example, in a case in which the low-temperature sealing treatment method is used in the sealing treatment step, the chemical conversion treatment liquid particularly preferably contains chromium or zirconium, which is used in the sealing treatment liquid. Trivalent chromium salts can be used as a chromium source as in the sealing treatment liquid. Both organic types such as zirconium tetraethoxide and zirconium tetraisopropoxide, and inorganic types such as zirconium oxychloride, zirconium hydroxide, zirconium sulfate, and zirconium carbonate can be used as a zirconium source. Since chemical conversion treatment liquid containing the same components as the primary components of the sealing treatment liquid is used in this manner, the chemical conversion coating film 17 and the anodized film 16 contain the same kind of components continuously across their surfaces, and accordingly, the chemical conversion coating film 17 is formed in harmony with the anodized film 16, thereby exhibiting high barrier characteristics and significantly improving corrosion resistance.

Figure 13:
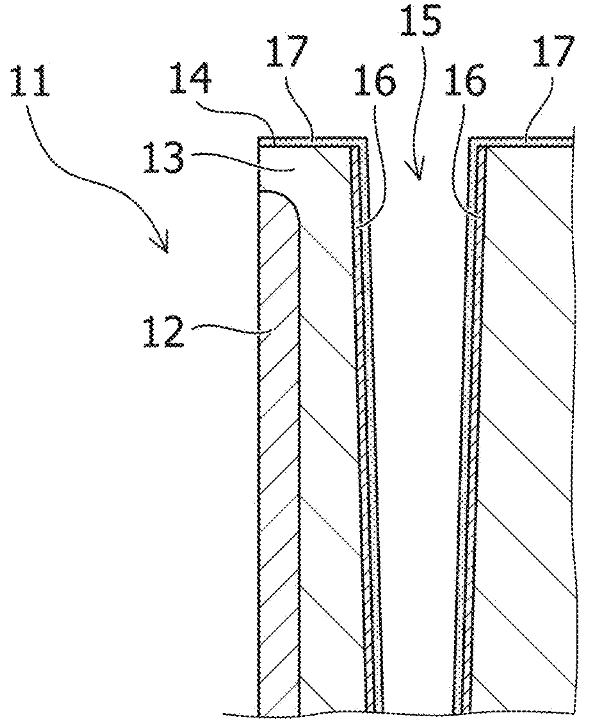
FIG. 13 is a partially enlarged cross-sectional view of the outboard-motor cylinder block body in dotted line frame E in FIG. 4 for description of the embodiment of the manufacturing method for an outboard-motor cylinder block according to the present invention.

Then, in the chemical conversion coating step, honing fabrication is performed on the cylinder block body 10 with the entire surface covered with the chemical conversion coating film 17 to remove the chemical conversion coating film 17 on the inner peripheral surface of each cylinder bore 11 and align the surfaces of the cast iron of a cylinder sleeve 12 and the aluminum alloy of the base material 13 as illustrated in FIG. 13. The honing fabrication may employ conventional methods in which a honing tool (not illustrated) is inserted and rotated in each cylinder bore 11 to polish the inner peripheral surface of the cylinder bore 11 with a whetstone of the honing tool, and thus the inner peripheral surface of the cylinder bore 11 can be fabricated as in conventional cases even though the chemical conversion coating film 17 is formed.

With the manufacturing method for an outboard-motor cylinder block, including such steps according to the present embodiment, it is possible to obtain an outboard-motor cylinder block in which the cast iron of the cylinder sleeve 12 is not dissolved, the aluminum alloy as the base material 13 on the inner peripheral surface of the water jacket 15 is covered with the anodized film 16, the pores of the anodized film 16 are sealed with sealers, the sealed anodized film 16 is further covered with the chemical conversion coating film 17, and the aluminum alloy as the base material 13 on the joining surface 14 is covered with the chemical conversion coating film 17.

In particular, the inner peripheral surface of the water jacket 15 is a place that is close to a combustion chamber and under high-temperature conditions, contacts or is likely to contact cooling water (seawater), and is prone to corrosion, and thus, corrosion resistance can be improved by further forming a chemical conversion coating film on the sealed anodized film. Moreover, the joining surface 14 of the cylinder block potentially corrodes when a small amount of cooling water (seawater) penetrates between the surface and the gasket, but even when the chemical conversion coating film 17 is formed on the joining surface 14 after the finishing processing, smoothness of the joining surface 14 is maintained and the sealing characteristics with the gasket is favorable, and in addition, since the r 17 is formed integrally with the inner peripheral surface of the water jacket 15, it is possible to prevent seepage and improve corrosion resistance. In particular, corrosion resistance is concerned when an inexpensive ADC material or AC material is used as the aluminum alloy, and thus, there is significant advantage to employing such a configuration.

Note that shot blast treatment may be performed on the cylinder block body 10 before the anodized film formation step is performed. By performing the shot blast treatment in this manner, it is possible to remove a Si chill layer segregated in the aluminum alloy of the base material 13, which causes color unevenness on the exterior surface. With this, it is possible to reduce color unevenness on the surface of an outboard-motor cylinder block finally obtained.

Treatment conditions of the shot blast treatment are not particularly limited as long as the Si chill layer (segregation) in the aluminum alloy of the base material 13 can be removed or crushed, but it is preferable to use shot particles with an average particle size of 400 to 600 μm. Moreover, the surface roughness Ra of the aluminum alloy after the shot blast treatment is preferably 5 μm or greater.

The cylinder block body 10 may be cleaned with alkaline liquid after the shot blast treatment and before the anodized film formation step is performed. Accordingly, Si removed by the shot blast treatment and the like can be washed away from the cylinder block body 10, and color unevenness of the cylinder block body 10 can be adjusted or reduced by the alkaline liquid. The alkaline liquid preferably contains sodium hydroxide or lithium hydroxide as a basic component and may be, for example, a commercially available alkaline cleaning agent or alkaline machining liquid.

Before the anodized film formation step is performed, the cylinder block body 10 may be treated with alkaline liquid instead of the shot blast treatment. The aluminum alloy around the Si chill layer, which causes color unevenness on the exterior surface, can be dissolved and Si can be removed. With this as well, it is possible to reduce color unevenness on the surface of an outboard-motor cylinder block finally obtained.

Even in a case in which the shot blast treatment is not performed, the sealed anodized film 16 of the cylinder block body 10 may be treated with alkaline liquid after the finishing processing step and before the chemical conversion coating step. By adjusting the color tone of the surface of the anodized film 16 with alkaline liquid in this manner, it is possible to reduce color unevenness of the surface of an outboard-motor cylinder block finally obtained even when an Si chill layer is segregated in the aluminum alloy of the base material 13. This treatment of the anodized film 16 with alkaline liquid may be performed in combination with the above-described shot blast treatment.

EXAMPLES

Improvement of color unevenness of the cylinder block with the shot blast treatment and alkaline liquid was tested. A shot blast device including a projection nozzle was used for the shot blast treatment, and shot particles with an average particle size of 400 to 600 μm were used. The shot particles were sprayed and impacted the cylinder block body of an aluminum alloy ADC12 material. The surface roughness Ra of the cylinder block body before the shot blast treatment was approximately 0.6, but the surface roughness Ra after the shot blast treatment was approximately 6.0.

After the shot blast treatment, the cylinder block body was degreased and anodizing treatment was performed to form an anodized film of 5 to 15 um by the conventional direct-current electrolytic method. In the anodizing treatment, the cylinder block was immersed in a sulfuric acidic bath at a temperature of 20° C. and at a concentration of 200g/L and was subjected to a voltage at the current density of 1.5 $A/dm^2$ for 20 minutes. Subsequently, after washing with water, low-temperature sealing treatment (40° C., 4 minutes), washing with water, and washing with hot water, the finishing processing of the joining surface was performed by using alkaline machining liquid. Thereafter, the joining surface was degreased with alkaline cleaning liquid, and then chemical conversion treatment (50° C., 3 minutes) was performed on the cylinder block body by using chromate chemical conversion treatment liquid (product name: ALSURF). As a result, no color unevenness was observed on the entire surface of the cylinder block, and the surface exhibited uniform color tone.

What is claimed is:

1. An outboard-motor cylinder block, having a cylinder bore and a water jacket around the cylinder bore on a joining surface to be joined to a cylinder head, the cylinder block comprising:

a base material of the cylinder block, the base material being made of an aluminum alloy;

a cylindrical cylinder sleeve made of cast iron and cast into the aluminum alloy on an inner peripheral surface of the cylinder bore, wherein on a joining surface side of the inner peripheral surface of the cylinder bore, the aluminum alloy is exposed and a boundary exists between the cast iron and the aluminum alloy;

an anodized film covering the aluminum alloy on an inner peripheral surface of the water jacket, wherein pores of the anodized film being sealed with a sealing product, resulting in a sealed anodized film; and a chemical conversion coating film covering the sealed anodized film, the chemical conversion coating film excluding an anodized film, wherein the chemical conversion coating film further directly covers the aluminum alloy on the joining surface without an anodized film interposed therebetween.

2. The outboard-motor cylinder block according to claim 1, wherein the chemical conversion coating film contains a primary component of the sealing product.

3. The outboard-motor cylinder block according to claim 2, wherein the primary component of the sealing product is chromium and/or zirconium.

4. A manufacturing method for an outboard-motor cylinder block, wherein an outboard-motor cylinder block body has a cylinder bore and a water jacket around the cylinder bore formed on a joining surface to be joined to a cylinder head, and wherein a cylindrical cylinder sleeve made of cast iron is cast into an aluminum alloy as a base material of the cylinder block on an inner peripheral surface of the cylinder bore, the cylinder sleeve being exposed to protrude inward in the radial direction of the cylinder bore relative to the base material, and the base material being exposed at an end part on the cylinder head side of the inner peripheral surface of the cylinder bore and at another end part on a crank shaft side opposite the cylinder head side, the manufacturing method comprising the steps of:

pressing the end part on the cylinder head side where the base material is exposed with a first elastic jig and pressing the other end part on the crank shaft side where the base material is exposed with a second elastic jig;

forming an anodized film on a surface of an aluminum alloy part of the outboard-motor cylinder block body other than the cylinder bore by carrying out an anodizing treatment in a state of being pressed with the first and second elastic jigs;

sealing a surface of the anodized film by carrying out a sealing treatment in the state of being pressed with the first and second elastic jigs;

detaching the first and second elastic jigs and subjecting the joining surface to a finishing processing which removes the anodized film on the joining surface to expose the aluminum alloy as the base material; and forming a chemical conversion coating film on a surface of the anodized film covering an inner peripheral surface of the water jacket and on a surface of the aluminum alloy exposed on the joining surface, the chemical conversion coating film excluding an anodized film.

5. The manufacturing method for an outboard-motor cylinder block according to claim 4, wherein the first and second elastic jigs are each an elastic bag body fluidly communicating with a gas supply unit, and wherein in the pressing step, the elastic bag bodies are disposed in the cylinder bore and supplied with gas from the gas supply unit to inflate the elastic bag bodies so that the end parts on the cylinder head side and the crank shaft side where the base material is exposed are pressed with the elastic bag bodies.

6. The manufacturing method for an outboard-motor cylinder block according to claim 5, wherein the elastic bag bodies are inflated so that a maximum outer diameter part of each elastic bag body in the radial direction of the cylinder bore is formed outside the end parts on the cylinder head side and the crank shaft side of the inner peripheral surface of the cylinder bore and so that the maximum outer diameter of each elastic bag body in the radial direction of the cylinder bore becomes larger than the inner peripheral diameters of the end parts on the cylinder head side and the crank shaft side of the inner peripheral surface of the cylinder bore where the base material is exposed.

7. The manufacturing method for an outboard-motor cylinder block according to claim 4, wherein shot blast treatment or alkaline liquid treatment is carried out on the outboard-motor cylinder block body before the step of forming the anodized film.

8. The manufacturing method for an outboard-motor cylinder block according to claim 7, wherein the sealed anodized film of the outboard-motor cylinder block body is treated with alkaline liquid after the step of finishing processing and before the step of forming the chemical conversion coating film.

9. The manufacturing method for an outboard-motor cylinder block according to claim 4, wherein the sealed anodized film of the outboard-motor cylinder block body is treated with alkaline liquid after the step of finishing processing and before the step of forming the chemical conversion coating film.

* * * * *